US010620874B2

(12) United States Patent
Yan et al.

(10) Patent No.: US 10,620,874 B2
(45) Date of Patent: Apr. 14, 2020

(54) MEMORY MANAGEMENT METHOD, MEMORY CONTROL CIRCUIT UNIT AND MEMORY STORAGE APPARATUS

(71) Applicant: PHISON ELECTRONICS CORP., Miaoli (TW)

(72) Inventors: Horng-Sheng Yan, Penghu County (TW); Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 14/828,464

(22) Filed: Aug. 17, 2015

(65) Prior Publication Data

US 2017/0003897 A1    Jan. 5, 2017

(30) Foreign Application Priority Data

Jul. 1, 2015    (TW) .............................. 104121373 A

(51) Int. Cl.
*G06F 3/06*        (2006.01)
*G06F 12/02*        (2006.01)

(52) U.S. Cl.
CPC ............ *G06F 3/0655* (2013.01); *G06F 3/061* (2013.01); *G06F 3/0679* (2013.01);
(Continued)

(58) Field of Classification Search
CPC .... G06F 3/0619; G06F 3/0679; G06F 3/0655; G06F 12/0246; G06F 2212/7201;
(Continued)

(56) References Cited

U.S. PATENT DOCUMENTS 8,296,507 B2 * 10/2012 Yeh ..................... G06F 12/0246
711/103
8,489,942 B1 * 7/2013 Wong .................. G06F 12/0246
365/185.33
(Continued)

FOREIGN PATENT DOCUMENTS

CN        102193869        9/2011
CN        103488579        1/2014

OTHER PUBLICATIONS

Office Action of China Counterpart Application, dated Nov. 19, 2018, pp. 1-9.

*Primary Examiner* — Gary J Portka
(74) *Attorney, Agent, or Firm* — JCIPRNET

(57) ABSTRACT

A memory management method, a memory control circuit unit and a memory storage apparatus are provided. The method includes: receiving a first write command and writing data corresponding to the first write command into a first spare physical erasing unit; detecting an amount of second spare physical erasing units excluding the first spare physical erasing unit; determining whether the amount of the second spare physical erasing units is less than a threshold value; and performing a first procedure if the amount of the second spare physical erasing units is less than the threshold value. The first procedure includes: moving valid data in the physical erasing units into at least one third spare physical erasing unit; and adjusting the threshold value from a first threshold value to a second threshold value.

24 Claims, 6 Drawing Sheets

(52) U.S. Cl.
CPC .. *G06F 12/0246* (2013.01); *G06F 2212/7201* (2013.01); *G06F 2212/7209* (2013.01)

(58) Field of Classification Search
CPC ......... G06F 2212/7209; G06F 12/0253; G06F 3/061; G06F 3/0652; G06F 3/0688; G06F 2212/7205
USPC .................................................. 711/103, 165
See application file for complete search history.

(56) References Cited

U.S. PATENT DOCUMENTS

| | | | | |
|---|---|---|---|---|
| 8,737,126 B2* | 5/2014 | Lin | ..................... | G11C 11/5628 365/185.03 |
| 2002/0078303 A1* | 6/2002 | Rozario | ................ | G06F 12/023 711/133 |
| 2008/0201553 A1* | 8/2008 | Kawamoto | ......... | G06F 12/0246 711/206 |
| 2011/0022778 A1* | 1/2011 | Schibilla | ............. | G06F 12/0246 711/103 |
| 2011/0119430 A1* | 5/2011 | Lai | ...................... | G06F 12/0246 711/103 |
| 2011/0231597 A1* | 9/2011 | Lai | ...................... | G06F 12/0246 711/103 |
| 2013/0125097 A1* | 5/2013 | Ebcioglu | ............. | G06F 17/5045 717/136 |
| 2013/0282955 A1* | 10/2013 | Parker | ................. | G06F 12/0246 711/103 |
| 2014/0032817 A1* | 1/2014 | Bux | ..................... | G06F 12/0246 711/103 |
| 2014/0181372 A1* | 6/2014 | Liu | ..................... | G06F 12/0862 711/103 |
| 2014/0281127 A1* | 9/2014 | Marcu | ................. | G06F 12/0246 711/103 |
| 2016/0103617 A1* | 4/2016 | Kang | .................. | G06F 12/0246 711/103 |
| 2016/0132253 A1* | 5/2016 | Chiu | .................... | G06F 3/0608 711/103 |
| 2016/0162205 A1* | 6/2016 | Grimsrud | .............. | G06F 3/0616 711/103 |
| 2016/0364142 A1* | 12/2016 | Kanno | .................... | G06F 3/061 |

\* cited by examiner

MEMORY MANAGEMENT METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 104121373, filed on Jul. 1, 2015. The entirety of the above-mentioned patent application is hereby incorporated by reference herein and made a part of this specification.

BACKGROUND

Technical Field

The invention relates to a memory management mechanism, and more particularly, relates to a memory management method, a memory control circuit unit and a memory storage apparatus.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage apparatus which utilizes a flash memory as its storage medium. For these reasons, the flash memory has become an import part of the electronic industries.

In general, a rewritable non-volatile memory storage apparatus performs a moving and reassembling procedure for valid data every once in a while. The reference for determining whether to perform the moving and reassembling procedure for the valid data is already determined when the rewritable non-volatile memory storage apparatus left the factory. However, because an execution efficiency of the moving and assembling procedure for the valid data is unstable, a data access speed of the rewritable non-volatile memory storage apparatus may also be unstable accordingly.

Accordingly, it is one of the major subjects in the industry as how to achieve equilibrium between the execution efficiency of the moving and assembling procedure for the valid data and the data access speed of the rewritable non-volatile memory storage apparatus.

Nothing herein may be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a memory management method, a memory control circuit unit and a memory storage apparatus, which are capable of solving the issue of unstable data access speed of the rewritable non-volatile memory storage apparatus caused by moving the valid data.

A memory management method for a rewritable non-volatile memory module is provided according to an exemplary embodiment of the invention, and the rewritable non-volatile memory module includes a plurality of physical erasing units. The memory management method includes: receiving a first write command and writing data corresponding to the first write command into a first spare physical erasing unit among the physical erasing units; detecting an amount of a plurality of second spare physical erasing units excluding the first spare physical erasing unit among the physical erasing units; determining whether the amount of the second spare physical erasing units is less than a threshold value; and performing a first procedure if the amount of the second spare physical erasing units is less than the threshold value. The first procedure includes: instructing to move a plurality of valid data in the physical erasing units into at least one third spare physical erasing unit among the physical erasing units; and adjusting the threshold value from a first threshold value to a second threshold value.

A memory control circuit unit configured to control a rewritable non-volatile memory module is provided according to an exemplary embodiment of the invention. The memory control circuit unit includes a host interface, a memory interface and a memory management circuit. The host interface is configured to couple to a host system. The memory interface is configured to couple to the rewritable non-volatile memory module, wherein the rewritable non-volatile memory module includes a plurality of physical erasing units. The memory management circuit is coupled to the host interface and the memory interface. The memory management circuit is configured to receive a first write command and send a write command sequence which instructs to write data corresponding to the first write command into a first spare physical erasing unit among the physical erasing units. The memory management circuit is further configured to detect an amount of a plurality of second spare physical erasing units excluding the first spare physical erasing unit among the physical erasing units and determine whether the amount of the second spare physical erasing units is less than the threshold value. The memory management circuit is further configured to perform a first procedure if the amount of the second spare physical erasing units is less than the threshold value. The first procedure includes: instructing to move a plurality of valid data in the physical erasing units into at least one third spare physical erasing unit among the physical erasing units; and adjusting the threshold value from a first threshold value to a second threshold value.

A memory storage apparatus is provided according to an exemplary embodiment of the invention, and the memory storage apparatus includes a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is configured to receive a first write command and send a write command sequence which instructs to write data corresponding to the first write command into a first spare physical erasing unit among the physical erasing units. The memory control circuit unit is further configured to detect an amount of a plurality of second spare physical erasing units excluding the first spare physical erasing unit among the physical erasing units and determine whether the amount of the second spare physical erasing units is less than the threshold value. The memory control circuit unit is further configured to perform a first procedure if the amount of the second spare physical erasing units is less than the threshold value. The first procedure includes: instructing to move a plurality of valid data in the physical erasing units into at least one third spare physical erasing unit among the physical erasing units; and adjusting the threshold value from a first threshold value to a second threshold value.

Based on the above, the memory management method, the memory control circuit unit and the memory storage apparatus provided by the invention are capable of dynamically adjusting the threshold value for determining whether to perform the moving operation for the valid data. Accordingly, by controlling the trigger of the moving operation for the valid data, the data access speed of the rewritable non-volatile memory module may be stable.

To make the above features and advantages of the present disclosure more comprehensible, several embodiments accompanied with drawings are described in detail as follows.

It may be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
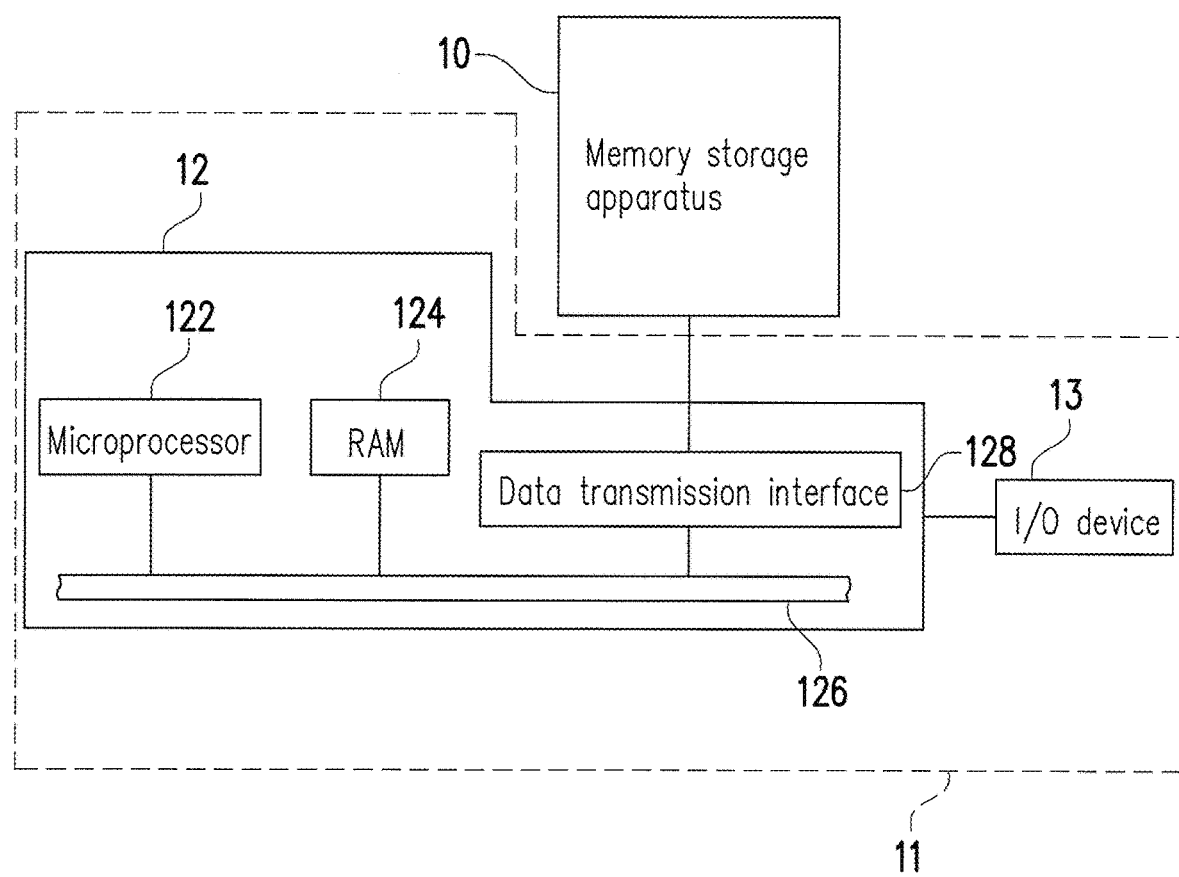
FIG. 1 is a schematic diagram illustrating a host system and a memory storage apparatus according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (also known as a memory storage system) includes a rewritable non-volatile memory module and a controller (also known as a control circuit). The memory storage apparatus is usually configured together with a host system so that the host system may write data into the memory storage apparatus or read data from the memory storage apparatus.

Figure 2:
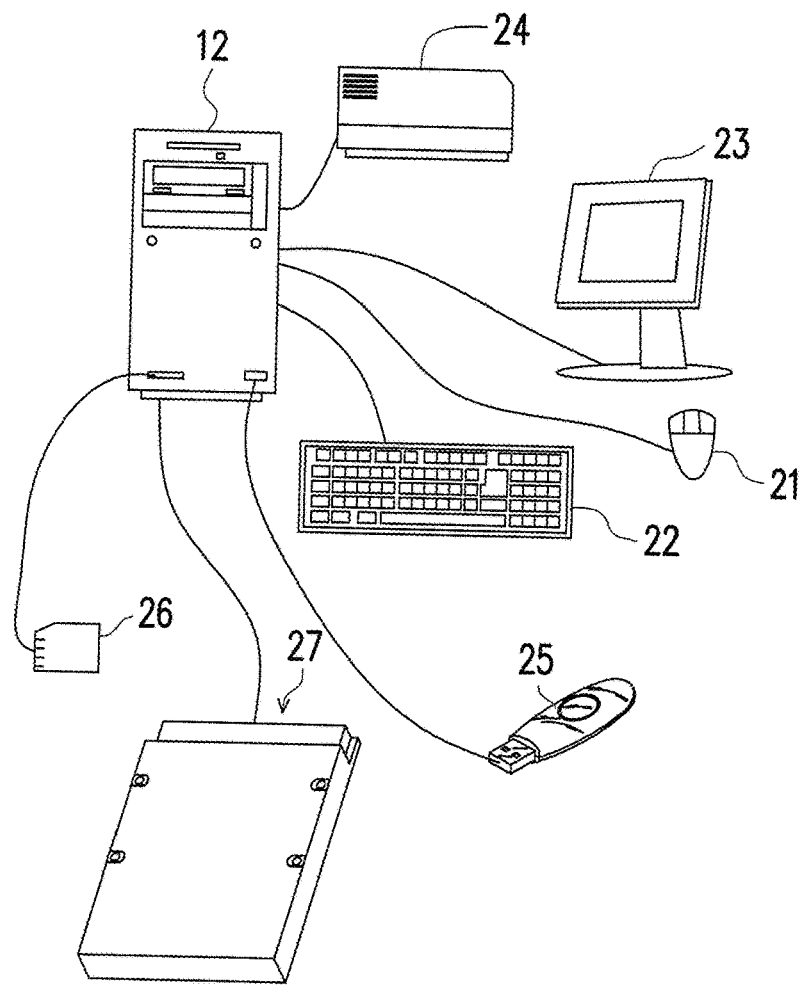
FIG. 2 is a schematic diagram of a computer, an input/output device, and a memory storage apparatus according to an exemplary embodiment of the invention.

FIG. 1 is a schematic diagram illustrating a host system and a memory storage apparatus according to an exemplary embodiment of the invention. FIG. 2 is a schematic diagram of a computer, an input/output device, and a memory storage apparatus according to an exemplary embodiment of the invention.

Referring to FIG. 1, a host system 11 includes a computer 12 and an input/output (I/O) device 13. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It may be understood that the devices illustrated in FIG. 2 are not intended to limit the I/O device 13, and the I/O device 13 may further include other devices.

In an exemplary embodiment, the memory storage apparatus 10 is coupled to other devices of the host system 11 through the data transmission interface 128. By using the microprocessor 122, the random access memory 124 and the Input/Output (I/O) device 13, data may be written into the memory storage apparatus 10 or may be read from the memory storage apparatus 10. For example, the memory storage apparatus 10 may be a rewritable non-volatile memory storage apparatus such as a flash drive 25, a memory card 26 or a solid state drive (SSD) 27 as shown by FIG. 2.

Figure 3:
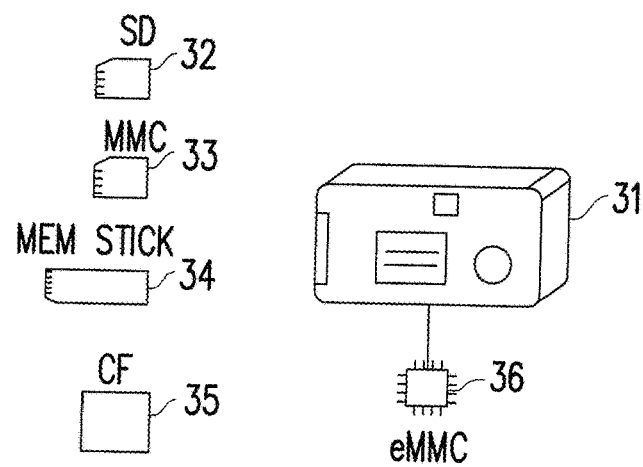
FIG. 3 is a schematic diagram illustrating a host system and a memory storage apparatus according to an exemplary embodiment of the invention.

FIG. 3 is a schematic diagram illustrating a host system and a memory storage apparatus according to an exemplary embodiment of the invention.

Generally, the host system 11 may substantially be any system capable of storing data with the memory storage apparatus 10. Even though the host system 11 is illustrated as a computer system in the present exemplary embodiment, however, in another exemplary embodiment of the present invention, the host system 11 may be a digital camera, a video camera, a telecommunication device, an audio player, or a video player. For example, when the host system is a digital camera (video camera) 31, the rewritable non-volatile memory storage apparatus may be a SD card 32, a MMC card 33, a memory stick 34, a CF card 35 or an embedded storage device 36 (as shown by FIG. 3). The embedded storage device 36 includes an embedded MMC (eMMC). It may be mentioned that the eMMC is directly coupled to a substrate of the host system.

Figure 4:
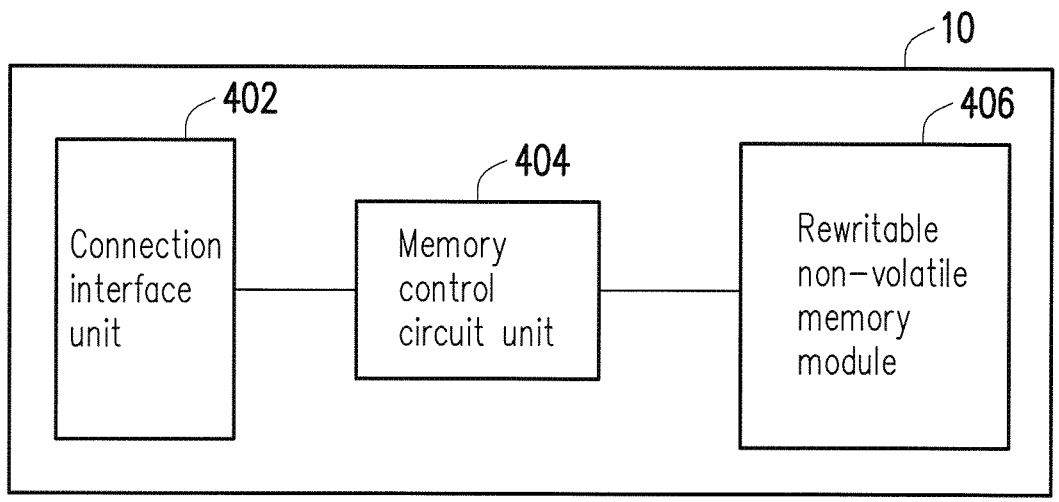
FIG. 4 is a schematic block diagram illustrating the memory storage apparatus depicted in FIG. 1.

FIG. 4 is a schematic block diagram illustrating the memory storage apparatus depicted in FIG. 1.

Referring to FIG. 4, the memory storage apparatus 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. However, the invention is not limited thereto, and the connection interface unit 402 may also be compatible to a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory stick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and execute operations of writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a Single Level Cell (SLC) NAND flash memory module (i.e., a flash memory module capable of storing one bit data in one memory cell), a Multi Level Cell (MLC) NAND flash memory module (i.e., a flash memory module capable of storing two bit data in one memory cell), a Triple Level Cell (TLC) NAND flash memory module (i.e., a flash memory module capable of storing three bit data in one memory cell), other flash memory modules or any memory module having the same features.

Figure 5:
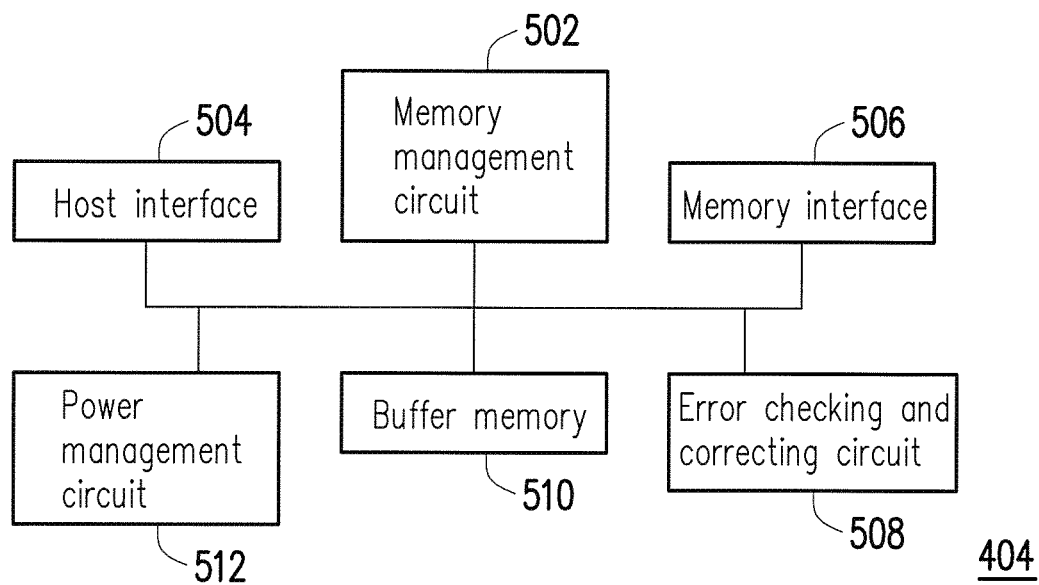
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504, a memory interface 506 and an error checking and correcting circuit 508.

The memory management circuit 502 is configured to control overall operations of the memory control circuit unit 404. Specifically, the memory management circuit 502 has a plurality of control commands. During operations of the memory storage apparatus 10, the control commands are executed to execute various operations such as writing, reading and erasing data. Hereinafter, operations of the memory management circuit 502 are described as equivalent to describe operations of the memory control circuit unit 404.

In the present exemplary embodiment, the control commands of the memory management circuit 502 are implemented in a form of a firmware. For instance, the memory management circuit 502 has a microprocessor unit (not illustrated) and a ROM (not illustrated), and the control commands are burned into the ROM. When the memory storage apparatus 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). In particular, the ROM has a boot code, which is executed by the microprocessor unit to load the control commands stored in the rewritable non-volatile memory module 406 to the RAM of the memory management circuit 502 when the memory control circuit unit 404 is enabled. Thereafter, the control commands are executed by the microprocessor unit to execute operations of writing, reading or erasing data.

Further, in another exemplary embodiment, the control commands of the memory management circuit 502 may also be implemented in a form of hardware. For example, the memory management circuit 502 includes a microprocessor, a physical unit management circuit, a memory writing circuit, a memory reading circuit, a memory erasing circuit and a data processing circuit. The physical unit management circuit, the memory writing circuit, the memory reading circuit, the memory erasing circuit and the data processing circuit are coupled to the microprocessor. The physical unit management circuit is configured to manage the physical erasing units of the rewritable non-volatile memory module 406; the memory writing circuit is configured to issue a write command sequence to the rewritable non-volatile memory module 406 in order to write data into the rewritable non-volatile memory module 406; the memory reading circuit is configured to issue a read command sequence to the rewritable non-volatile memory module 406 in order to read data from the rewritable non-volatile memory module 406; the memory erasing circuit is configured to issue an erase command sequence to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406. Each of the write command sequence, the read command sequence and the erase command sequence may include one or more program codes or command codes, respectively, and instruct the rewritable non-volatile memory module 406 to perform the corresponding operations, such as writing, reading and erasing.

The host interface 504 is coupled to the memory management circuit 502 and configured to receive and identify commands and data sent from the host system 11. In other words, the commands and data sent from the host system 11 are passed to the memory management circuit 502 through the host interface 504. In the present exemplary embodiment, the host interface 504 is compatible with the SATA standard. However, it may be understood that the present invention is not limited thereto, and the host interface 504 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences configured to instruct performing various memory operations (e.g., for changing read voltage levels or performing a garbage collection procedure). Detailed descriptions regarding the above are omitted herein. These command sequences are generated by the memory management circuit 502 and transmitted to the rewritable non-volatile memory module 406 through the memory interface 506, for example. The command sequences may include one or more signals, or data stored in the bus. The signals or the data may include command codes and programming codes. For example, in a read command sequence, information such as identification codes and memory addresses are included.

The error checking and correcting circuit 508 is coupled to the memory management circuit 502 and configured to execute an error checking and correcting procedure to ensure the correctness of data. Specifically, when the memory management circuit 502 receives the write command from the host system 11, the error checking and correcting circuit 508 generates an error correcting code (ECC) and/or an error detecting code (EDC) for data corresponding to the write command, and the memory management circuit 502 writes the data corresponding to the write command and the corresponding ECC and/or EDC to the rewritable non-volatile memory module 406. Later, when the memory management circuit 502 reads the data from the rewritable non-volatile memory module 406, the corresponding ECC and/or the EDC are also read, and the error checking and correcting circuit 508 executes the error checking and correcting procedure on the read data based on the ECC and/or the EDC.

In an exemplary embodiment, the memory control circuit unit 404 further includes a buffer memory 510 and a power management circuit 512. The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage apparatus 10.

Figure 6:
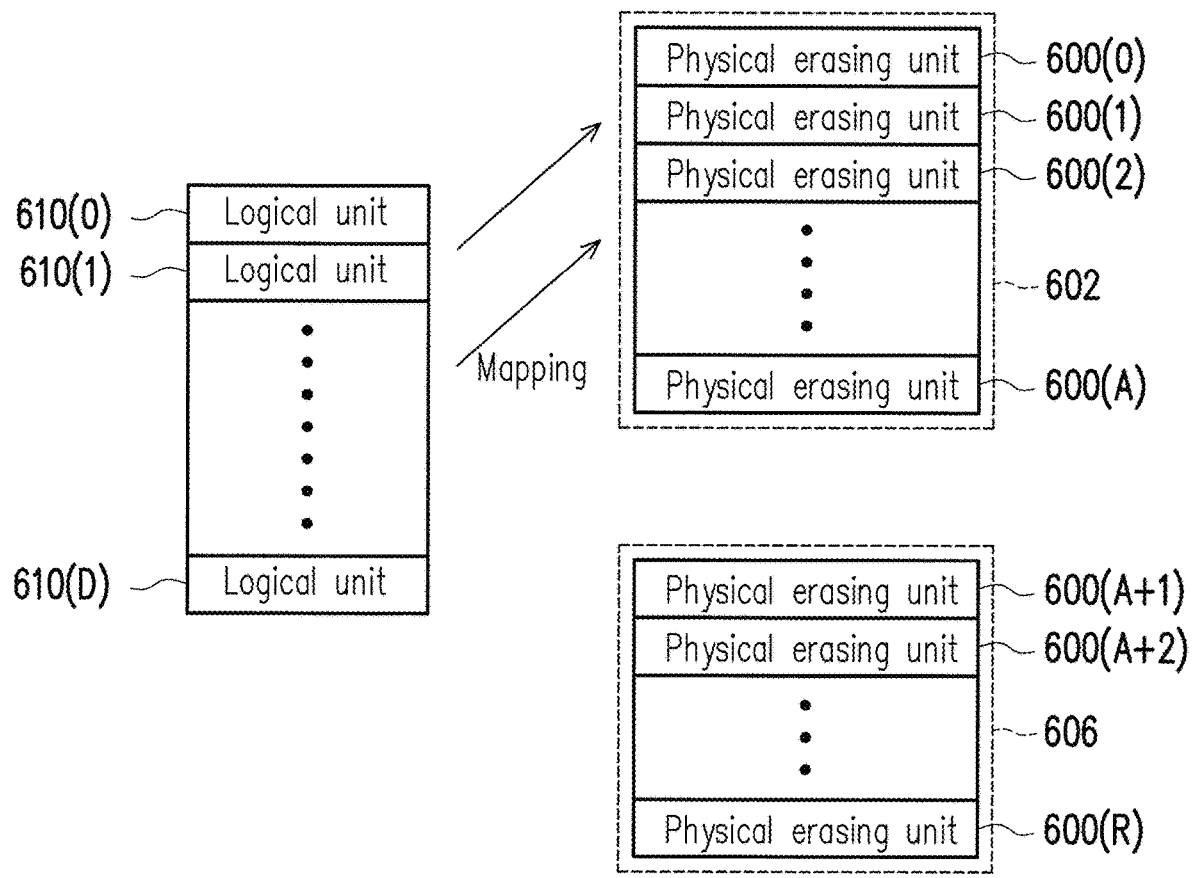
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention. It may be understood that terms, such as "select", "group", "divide", "associate" and so forth, are logical concepts which describe operations in the physical erasing units of the rewritable non-volatile memory module 406. That is, the physical erasing units of the rewritable non-volatile memory module 406 are logically operated, but actual positions of the physical units of the rewritable non-volatile memory module 406 are not changed.

The memory cells of the rewritable non-volatile memory module 406 constitute a plurality of physical programming units, and the physical programming units constitute a plurality of physical erasing units 600(0) to 600(R). Specifically, the memory cells on the same word line constitute one or more of the physical programming units. If each of the memory cells can store more than two bits, the physical programming units on the same word line can be at least classified into a lower physical programming unit and an upper physical programming unit. For instance, in the MLC NAND-type flash memory, a least significant bit (LSB) of one memory cell belongs to the lower physical programming unit, and a most significant bit (MSB) of one memory cell belongs to the upper physical programming unit. Generally, a writing speed of the lower physical programming unit is higher than a writing speed of the upper physical programming unit, or a reliability of the lower physical programming unit is higher than a reliability of the upper physical programming unit.

In the present exemplary embodiment, the physical programming unit is a minimum unit for programming. That is, the programming unit is the minimum unit for writing data. For example, the physical programming unit is a physical page or a physical sector. When the physical programming unit is the physical page, each physical programming unit usually includes a data bit area and a redundancy bit area. The data bit area has multiple physical sectors configured to store user data, and the redundant bit area is configured to store system data (e.g., an error correcting code). In the present exemplary embodiment, the data bit area contains 32 physical sectors, and a size of each physical sector is 512-byte (B). However, in other exemplary embodiments, the data bit area may also include 8, 16 physical sectors or different number (more or less) of the physical sectors, and the size of each physical sector may also be greater or smaller. On the other hand, the physical erasing unit is the minimal unit for erasing. Namely, each physical erasing unit contains the least number of memory cells to be erased together. For instance, the physical erasing unit is a physical block.

Referring to FIG. 6, the memory management circuit 502 may logically divide the physical erasing units 600(0) to 600(R) of the rewritable non-volatile memory module 406 into a plurality of areas such as a storage area 602 and a system area 606.

The physical erasing units in the storage area 602 are configured to store data from the host system 11. The storage area 602 stores valid data and invalid data. For example, when the host system intends to delete one valid data, the data being deleted may still be stored in the storage area 602 but marked as the invalid data. In the following exemplary embodiment, the physical erasing unit not storing the valid data is also known as a spare physical erasing unit. For example, the physical erasing unit being erased may become the spare physical erasing unit. Further, in the following exemplary embodiment, the physical erasing unit storing the valid data is also known as a non-spare physical erasing unit.

In an exemplary embodiment, if there are damaged physical erasing units in the storage area 602 or the system area 606, the physical erasing units in the storage area 602 may also be used to replace the damaged physical erasing units. If there are no available physical erasing units in the storage area 602 for replacing the damaged physical erasing units, the memory management circuit 502 can announce that the memory storage apparatus 10 is in a write protect status, so that data can no longer be written thereto.

The physical erasing units in the system area 606 are configured to record system information including information related to manufacturer and model of a memory chip, an amount of physical erasing units in the memory chip, a number of the physical programming unit in each physical erasing unit, and so forth.

In an exemplary embodiment, amounts of the physical erasing units in the storage area 602 and the system area 606 may be different based on different memory specifications.

In addition, it may be understood that, during operations of the memory storage apparatus 10, grouping relations of the physical erasing units associated to the storage area 602 and the system area 606 may be dynamically changed. For example, when damaged physical erasing units in the system area 606 are replaced by the physical erasing units in the storage area 602, the physical erasing units originally from the storage area 602 are then associated to the system area 606.

In the present exemplary embodiment, the memory management circuit 502 allocates logical units 610(0) to 610(D) for mapping to the physical erasing units 600(0) to 600(A) in the storage area 602. For example, in the present exemplary embodiment, the host system 11 accesses the data stored in the storage area 602 through logical addresses. Therefore, each of the logical units 610(0) to 610(D) refers to one logical address. In addition, in another exemplary embodiment, each of the logical units 610(0) to 610(D) may also refer to one logical sector, one logical programming unit, one logical erasing unit or may be a composition of a plurality of consecutive logical addresses.

In the present exemplary embodiment, each of the logical units 610(0) to 610(D) maps to one or more physical units. In the present exemplary embodiment, one physical unit refers to one physical erasing unit. However, in another exemplary embodiment, one physical unit may also be one physical address, one physical sector, one physical programming unit, or a composition of a plurality of consecutive physical addresses, which are not particularly limited in the invention. The memory management circuit 502 records mapping relations between the logical units and the physical units into at least one logical-to-physical mapping table. When the host system 11 intends to read the data from the memory storage apparatus 10 or write the data into the memory storage apparatus 10, the memory management circuit 502 access the data in the memory storage apparatus 10 according to the logical-to-physical mapping table.

Generally, after a write command is received from the host system 11, the spare physical erasing units in the storage area 602 may be used to store data corresponding to the write command. If an amount of the spare physical erasing units in the storage area 602 is insufficient, the memory management circuit 502 instructs the rewritable non-volatile memory module 406 to perform a data merging procedure. In an exemplary embodiment, the data merging procedure is also known as a garbage collection procedure.

In the data merging procedure, parts of the valid data distributed in the storage area 602 are collected and moved into specific spare physical erasing units, so as to release the physical erasing units storing the invalid data. If one specific data originally marked as the valid data is moved out from one non-spare physical erasing unit, the specific data is then marked as the invalid data in such non-spare physical erasing unit. If all the valid data stored in one specific non-spare physical erasing unit are moved out (i.e., all the data stored in the specific non-spare physical erasing unit are marked as the invalid data), the specific non-spare physical erasing unit may be erased to become one new spare physical erasing unit. On the other hand, the spare physical erasing unit used to store the collected valid data in the data merging procedure may become one new non-spare physical erasing unit.

In the present exemplary embodiment, the memory management circuit 502 receives a write command (hereinafter, also known as a first write command) from the host system 11 and selects one physical erasing unit from the storage area 602 according to the first write command. In the present exemplary embodiment, the selected physical erasing unit is a spare physical erasing unit (hereinafter, also known as a first spare physical erasing unit). However, in another exemplary embodiment, the selected physical erasing unit may also be a spare physical erasing unit already storing other write data.

The memory management circuit 502 sends a write command sequence to the rewritable non-volatile memory module 406 to instruct writing data corresponding to the first write command (hereinafter, also known as a first data) into the first spare physical erasing unit. For example, the first data is data to be stored according to instruction of the first write command. After selecting the first spare physical erasing unit, the memory management circuit 502 detects an amount of spare physical erasing units (hereinafter, also known as second spare physical erasing units) excluding the first spare physical erasing unit in the storage area 602. For example, the amount of the second spare physical erasing units is a total of remaining spare physical erasing units in the storage area 602 after the first spare physical erasing unit is selected.

The memory management circuit 502 determines whether the amount of the second spare physical erasing units is less than a threshold value. For example, the operation of determining whether the amount of the second spare physical erasing units is less than the threshold value is performed in response to the operation of receiving the first write command or selecting the first spare physical erasing unit by the memory management circuit 502. The threshold value may serve as a reference for determining whether an amount of the remaining spare physical erasing units in the storage area 602 is sufficient. For example, in the present exemplary embodiment, the threshold value may be "6". However, in another exemplary embodiment, the threshold value may also be a greater or smaller positive integer. If the amount of the second spare physical erasing units is less than the threshold value, it indicates that the amount of the remaining spare physical erasing units in the storage area 602 is insufficient, and therefore the memory management circuit 502 performs a data merging procedure (hereinafter, also known as a first procedure) to release the physical erasing unit storing the invalid data. However, if the amount of the second spare physical erasing units is not less than the threshold value, it indicates that the amount of the remaining spare physical erasing units in the storage area 602 is still sufficient, and therefore the memory management circuit 502 may choose not to perform the first procedure.

If it is determined to perform the first procedure, the memory management circuit 502 selects another spare physical erasing unit in the storage area 602 to store the valid data collected in the first procedure. After it is determined to perform the first procedure, in correspondence to the operation of writing the data from the host system 11 into one physical programming unit of the first spare physical erasing unit by the memory management circuit 502, a plurality of data (i.e., the valid data) is moved from an "N" number of continuous or discontinuous physical programming units in the storage area 602 into the spare physical erasing unit configured to store the valid data collected in the first procedure until the first procedure is stopped. Said "N" number of continuous or discontinuous physical programming units may be included in one or more physical erasing units. For example, if "N" is "2", in the first procedure, in correspondence to the operation of writing the first data into one specific physical programming unit of the first spare physical erasing unit, "two" valid data are moved from "two" continuous or discontinuous physical programming units in the storage area 602 into the spare physical erasing unit configured to store the collected valid data.

Before the first procedure is stopped, if more write commands are received, more data from the host system 11 are stored into the first spare physical erasing unit and more valid data from the storage area 602 are collected and moved into the spare physical erasing unit configured to store the collected valid data. If the first spare physical erasing unit is already or almost full, more of the spare physical erasing units may be selected to store the data from the host system 11. In the following exemplary embodiment, each of the spare physical erasing units selected for storing the data from the host system 11 in the first procedure may also be referred to as the first spare physical erasing unit.

Before the first procedure is stopped, if one or more spare physical erasing units currently selected for storing the collected valid data are already full or almost full, more of the spare physical erasing units may also be selected and used to store the collected valid data. In the following exemplary embodiment, the spare physical erasing units to be selected to store the collected valid data in the first procedure may also known as third spare physical erasing units.

In the first procedure, the memory management circuit 502 selects a plurality of spare physical erasing units (i.e., the third spare physical erasing units) from the storage area 602 and instructs the rewritable non-volatile memory module 406 to move the valid data stored in a plurality of non-spare physical erasing units in the storage area 602 into the third spare physical erasing units. For example, in an exemplary embodiment, the first procedure is preset to fill the "N" number of spare physical erasing units (i.e., the third spare physical erasing units) with the collected valid data in order to at least release an "N+1" number of new physical erasing units for storing the data from the host system 11. Among them, each of the spare physical erasing units configured to store the collected valid data becomes one non-spare physical erasing unit, and each of the non-spare physical erasing units in which the stored valid data are completely moved out becomes the spare physical erasing unit.

In the first procedure, the memory management circuit 502 further adjusts the threshold value for determining whether to perform the first procedure from a current value (hereinafter, also known as a first threshold value) to another value (hereinafter, also known as a second threshold value). In the present exemplary embodiment, the second threshold value is greater than the first threshold value. After it is determined to stop the first procedure, the memory management circuit 502 adjusts the threshold value from the second threshold value to another value (hereinafter, also known as a third threshold value). In an exemplary embodiment, each of the first threshold value, the second threshold value and the third threshold value is a preset value that does not change together with an execution of the first procedure. However, in the present exemplary embodiment, the first threshold value is one preset value, the second threshold value is instantly determined according to changes in the execution state of the first procedure, and the third threshold value is equal to the first threshold value.

In the present exemplary embodiment, during the process of moving the valid data to the third spare physical erasing units, the memory management circuit 502 determines whether an amount of a plurality of non-spare physical erasing units (hereinafter, also know as first non-spare physical erasing units) in which the stored valid data are completely moved out matches a preset amount. For example, the preset amount is "N+1". Herein, after completely moving the valid data out from a specific one of the first non-spare physical erasing units, that specific non-spare physical erasing unit becomes one released spare physical erasing unit. Therefore, in an exemplary embodiment, the operation of determining whether the amount of the first non-spare physical erasing unit matches the preset amount may also be regarded as an operation of determining whether an amount of the physical erasing units released in the first procedure reaches the preset amount.

If the amount of the first non-spare physical erasing units matches the preset amount, the memory management circuit 502 records an amount of at least one physical erasing unit currently-storing the valid data moved in the first procedure. In other words, in some exemplary embodiments, the third spare physical erasing units refer to the physical erasing units preset to store the collected valid data in the first procedure, and the amount of the at least one physical erasing unit currently-storing the valid data moved in the first procedure refer to a total of physical erasing units currently-storing the collected valid data among the third spare physical erasing units. The memory management circuit 502 determines the second threshold value according to the recorded amount (i.e., the amount of the at least one physical erasing unit currently-storing the valid data moved in the first procedure).

Figure 7A:
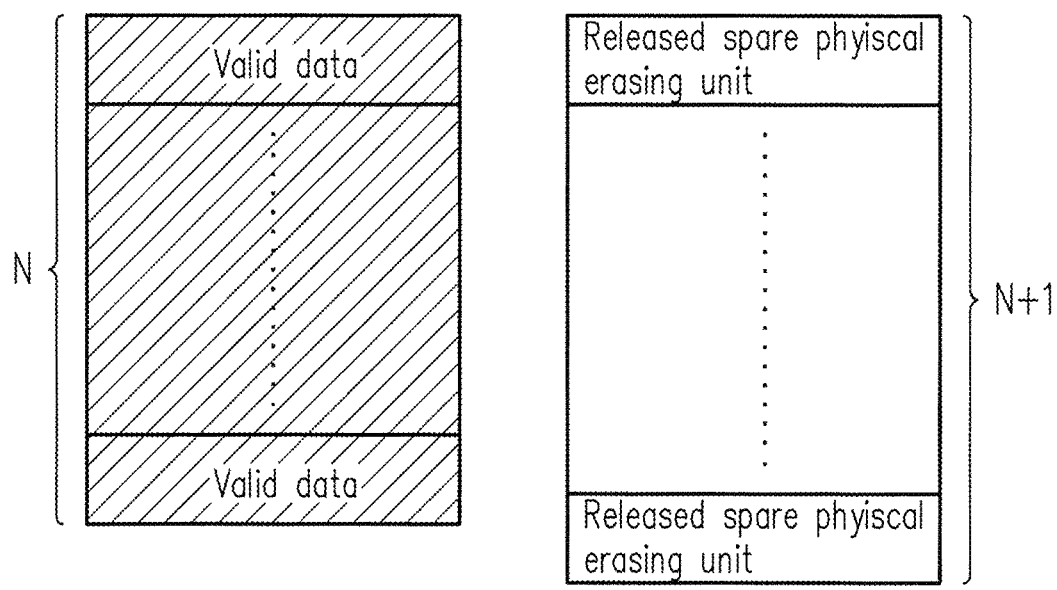
FIG. 7A and FIG. 7B are schematic diagrams illustrating a first procedure according to an exemplary embodiment invention.
Figure 7B:
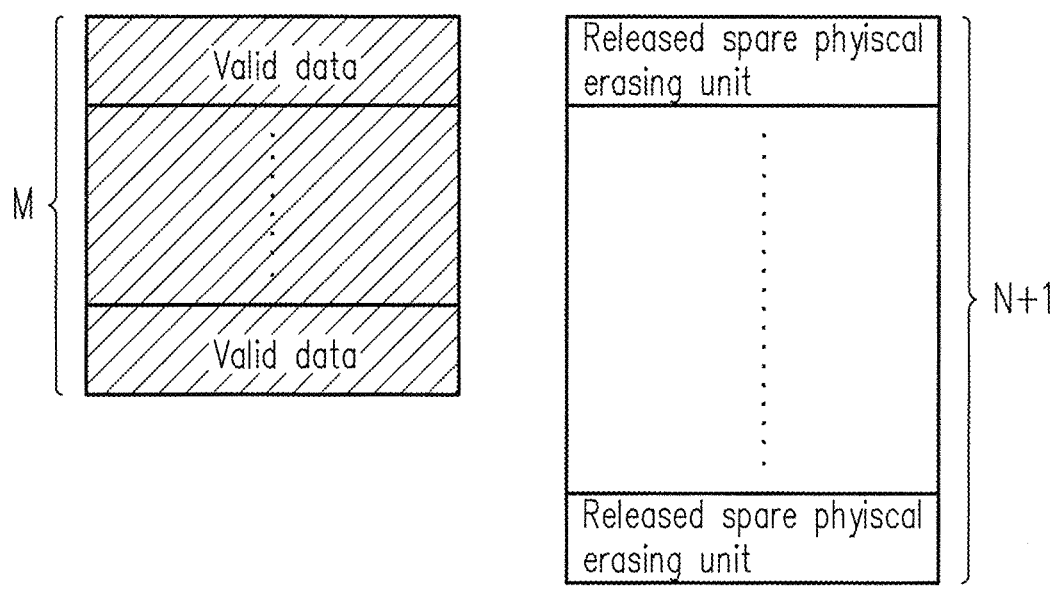

FIG. 7A and FIG. 7B are schematic diagrams illustrating a first procedure according to an exemplary embodiment invention.

Referring to FIG. 7A, the first procedure is predetermined to collect the valid data with the amount enough to fill the "N" number of spare physical erasing units (i.e., the third spare physical erasing units) before releasing the "N+1" number of spare physical erasing units.

Referring to FIG. 7B, in the present exemplary embodiment, if the "N+1" number of physical erasing units are released when the valid data with the amount only enough to write or fill a "M" number of physical erasing units is collected in the first procedure, a value of "M" is recorded. M may be a positive integer less than or equal to N.

In the present exemplary embodiment, the memory management circuit 502 determines a difference value between the first threshold value and the second threshold value according to a reference value corresponding to the preset amount and the recorded amount (e.g., "M"). Thereafter, the memory management circuit 502 determines the second threshold value according to the difference value. For example, assuming that the preset amount is "N+1", the reference value corresponding to the preset amount may be set as "N" (i.e., the preset amount minus one), and the memory management circuit 502 may subtract "M" from the reference value "N" to obtain a difference value "E" between the first threshold value and the second threshold value (i.e., $E=N-M$). Thereafter, the memory management circuit 502 may add the difference value "E" to the first threshold value "T1" to obtain the second threshold value "T2" (i.e., $T2=T1+E$).

It is worth mentioning that, in view of the foregoing embodiments, the difference value between the first threshold value and the second threshold value is related to a distribution of the valid data to be collected by the first procedure in the storage area 602 or an execution efficiency of the first procedure. For example, if the distribution of the valid data to be collected by the first procedure in the storage area 602 is more concentrated (i.e., the new spare physical erasing units with the amount matched to the preset amount may be released simply by collecting the valid data from fewer number of non-spare physical erasing units), the recorded "M" may be smaller and the difference value between the second threshold value "T2" and the first threshold value "T1" may be greater; and conversely, if the distribution of the valid data to be collected by the first procedure in the storage area 602 is more dispersed (i.e., the new spare physical erasing units with the amount matched to the preset amount may be released only by collecting the valid data from more number of non-spare physical erasing units), the recorded "M" may be greater (i.e., M may approach or be equal to N) and the difference value between the second threshold value "T2" and the first threshold value "T1" may be smaller.

Further, it may be noted that, in the foregoing exemplary embodiments, a concept for calculating the second threshold value "T2" may be simplified as: the second threshold value "T2"=the first threshold value "T1"+the reference value "N"−the recorded "M". However, in another exemplary embodiment, based on practical demands, such concept may also be implemented together with any logical operation. Alternatively, in another exemplary embodiment, parameters such as the first threshold value "T1", the reference value "N" (or the preset amount "N+1") and the recorded "M" may be input to a preset algorithm or used in a look-up table in order to obtain the second threshold value "T2".

In an exemplary embodiment, the memory management circuit 502 may also determine the preset amount (or the reference value) according to a total capacity of all the physical erasing units in the storage area 602 (hereinafter, also known as a total physical capacity) and a total capacity of all the available logical units being disposed (hereinafter, also known as a total logical capacity). Herein, the total physical capacity is greater than the total logical capacity. For example, the total logical capacity is equal to a maximum capacity for storing the user data which is set by the host system 11 or the memory management circuit 502.

Figure 8:
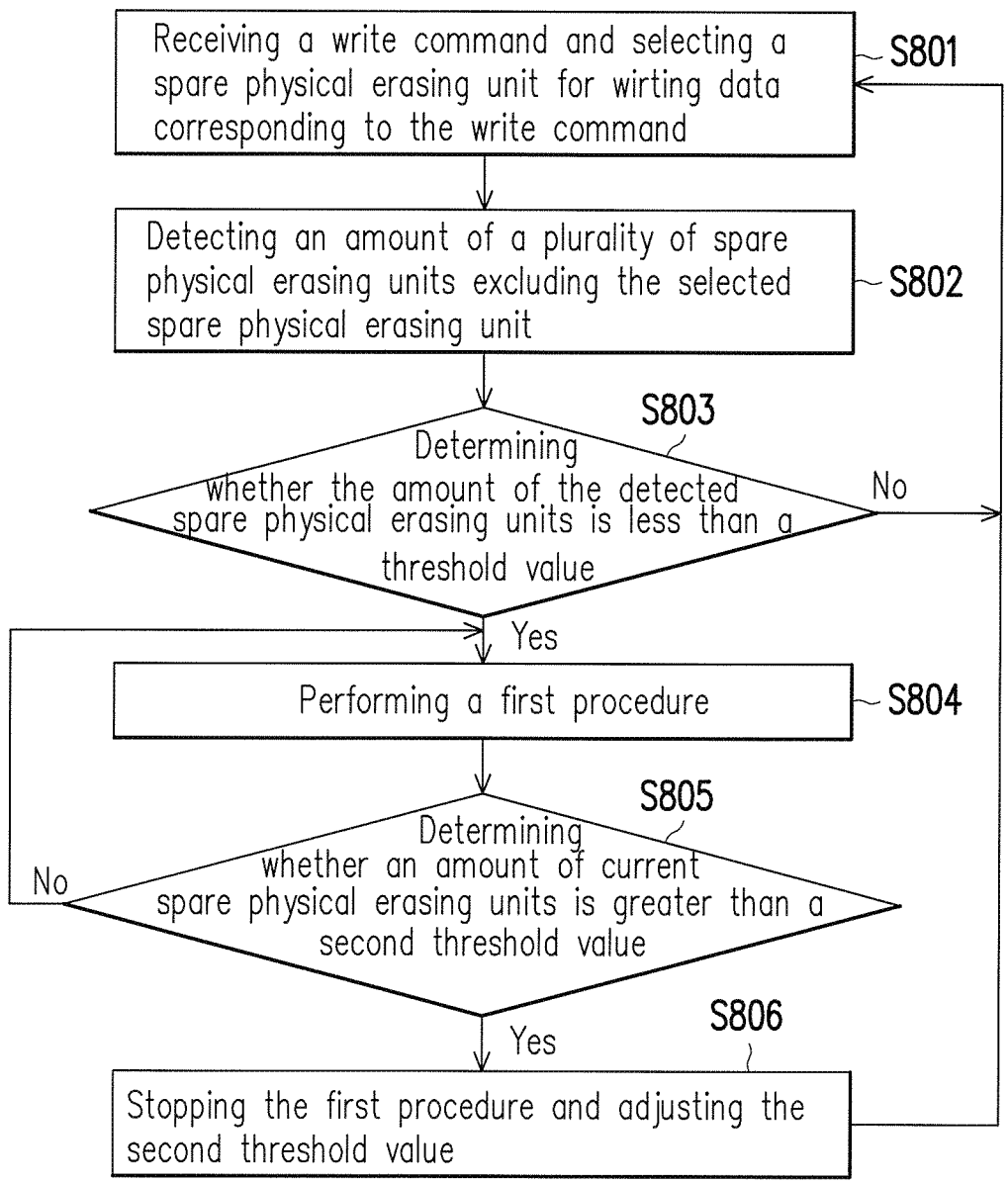
FIG. 8 is a flowchart illustrating a memory management method according to an exemplary embodiment of the invention.

For example, in an exemplary embodiment of FIG. 8, assuming that all the available logical units 610(0) to 610(D) corresponding to the rewritable non-volatile memory module 406 may be or are already used to store the valid data and the storage area 602 includes the physical erasing units 600(0) to 600(A), the preset amount "N+1" (or the reference value "N") may be determined according to a total logical capacity "L" of the logical units 610(0) to 610(D) and a total physical capacity "P" of the physical erasing units 600(0) to 600(A). For example, the reference value "N" may be obtained according to the total logical capacity "L"/(the total physical capacity "P"−the total logical capacity "L"). In the present exemplary embodiment, if the initially-calculated reference value "N" is not the positive integer, the reference value "N" may also be obtained by performing operations of rounding off to a closest positive integer, rounding up to a closest positive integer, calculating for a Gauss value or calculating one closest meaningful positive integer (e.g., powers of 2) for a result of the total logical capacity "L"/(the total physical capacity "P"−the total logical capacity "L"). In another exemplary embodiment, based on practical demands, the operations for obtaining the reference value "N" may also be implemented together with any logical operations. Further, in another exemplary embodiment, the total logical capacity "L" and the total physical capacity "P" may also be inputted into a preset algorithm or used in a look-up table to obtain the reference value "N" (or the preset amount "N+1)".

In another exemplary embodiment of FIG. 8, the total physical capacity "P" may also include a capacity of at least one physical erasing unit in the system area 606. In an exemplary embodiment, the total physical capacity may also be replaced by a total number of a plurality of physical units (e.g., the physical erasing units) used for calculating the total physical capacity, and the total logical capacity may also be replaced by a total number of a plurality of logical units for calculating the total logical capacity. In an exemplary embodiment, the calculated "N" is, for example, "32". However, "N" may also be a greater or smaller positive integer based on different specifications of the memory storage apparatus 10.

After the first procedure is started, if the memory management circuit 502 receives another write command (hereinafter, also known as a second write command) from the host system 11, the memory management circuit 502 detects an amount of current spare physical erasing units (hereinafter, also known as fourth physical erasing units) in the storage area 602. For example, the amount of the fourth spare physical erasing units refers to a total of all the current spare physical erasing units in the storage area 602, and the fourth spare physical erasing units may include the spare physical erasing units released in the first procedure. The memory management circuit 502 determines whether the amount of the fourth spare physical erasing units is greater than the threshold value.

It is worth mentioning that, in the present exemplary embodiment, the threshold value is already adjusted from the first threshold value to the second threshold value, and therefore the memory management circuit 502 practically determines whether the amount of the fourth spare physical erasing units in the storage area 602 is greater than the second threshold value. If the amount of the fourth spare physical erasing units is not greater than the second threshold value, the memory management circuit 502 continues to perform the first procedure. Methods regarding how to perform the first procedure have been described above, which are not repeated hereinafter. Further, if the amount of the fourth spare physical erasing units is greater than the second threshold value, the memory management circuit 502 stops the first procedure.

In the present exemplary embodiment, if it is determined to stop the first procedure, the memory management circuit 502 is further configured to adjust the threshold value for determining whether to perform the first procedure from the second threshold value back to the preset first threshold value. Accordingly, after the first procedure is stopped, if it is required to determine whether the amount of the remaining spare physical erasing units is sufficient in correspondence to one specific write command from the host system 11 again, the memory management circuit 502 uses the first threshold value again to determine whether to perform the next first procedure. If it is determined to perform the next first procedure, the memory management circuit 502 determines the corresponding second threshold value according to the execution state of said next first procedure. Thereafter, the memory management circuit 502 may determine whether to stop the performed first procedure according to the determined second threshold value and adjust the threshold value again in correspondence to the first procedure being stopped (e.g., adjusting the threshold value from the second threshold value to the first threshold value again, etc.). Operations regarding how to use to the first threshold value to determine whether to perform the first procedure, how to determine the corresponding second threshold value and how to use the second threshold value to determine whether to stop the first procedure have been described in the foregoing exemplary embodiments, which are not repeated hereinafter.

In other words, in comparison with the conventional methods for determining whether to start the data merging procedure and determining whether to stop the data merging procedure by using the same threshold value, an exemplary embodiment of the invention is capable of correspondingly setting the threshold value for stopping the data merging procedure according to the execution state of the data merging procedure being performed each time. For example, after it is determined to start the data merging procedure, the threshold value for stopping the data merging procedure may be adjusted to be greater than a current value according to the execution state of the current data merging procedure, so as to prolong the data merging procedure.

In an exemplary embodiment, if it is detected that the amount of the first non-spare physical erasing units matches the preset amount, a rule for selecting the non-spare physical erasing units in which the valid data is to be retrieved in the first procedure may be changed. For example, in an exemplary embodiment, before detecting that the amount of the first non-spare physical erasing units matches the preset amount, the memory management circuit 502 may select the non-spare physical erasing units in which the valid data is to be retrieved from the storage area 602 (i.e., the first non-spare physical erasing units) in the first procedure according to one preset rule (hereinafter, also known as a first rule). For example, the first rule may include selecting the non-spare physical erasing units having a more preferable moving efficiency for the valid data, such as those storing the valid data with the amount less than a preset value or those storing the invalid data with the amount greater than the preset value. After detecting that the amount of the first non-spare physical erasing units matches the preset amount, the memory management circuit 502 selects at least one non-spare physical erasing unit (hereinafter, also known as second non-spare physical erasing units) in which the valid data is still to be retrieved from the storage area 602 in the first procedure according to another preset rule (hereinafter, also known as a second rule). Herein, the first rule is different from the second rule. For example, the second rule may include selecting the non-spare physical erasing units having a less preferable moving efficiency for the valid data, such as those storing the valid data with the amount greater than aforesaid preset value, those storing the invalid data with the amount less than the preset value, or those randomly selected.

For example, in the exemplary embodiments of FIG. 7A and FIG. 7B, it is assumed that it is predetermined to collect the valid data enough to fill the "N" number of spare physical erasing units (i.e., the third spare physical erasing units) in the first procedure (as shown by FIG. 7A), but the "N+1" number of new spare physical erasing units are already released when the valid data enough to write or fill the "M" number of physical erasing units are collected (as shown by FIG. 7B). In this case, the valid data written into the "M" number of physical erasing units first are, for example, retrieved from the non-spare physical erasing units (i.e., the first non-spare physical erasing units) selected according to the first rule, and the valid data written into remaining "N−M" number or more of spare physical erasing units later are, for example, retrieved from the non-spare physical erasing units (i.e., the second non-spare physical erasing units) selected according to the second rule.

In other words, as compared to the second rule, the first rule is a rule that is more strict in selecting the non-spare physical erasing units, and the operation of selecting the non-spare physical erasing units according to the first rule may consume more system resources than the operation of selecting the non-spare physical erasing units according to the second rule. Therefore, in an exemplary embodiment, after detecting that the non-spare physical erasing units with the amount matched to the preset amount are released, the system resources wasted on searching for the non-spare physical erasing units may be saved by using the second rule to select the remaining non-spare physical erasing units in which the valid data are still to be retrieved. Furthermore, in another exemplary embodiment, it is also possible to maintain use of the first rule or the second rule in the first procedure to select all the non-spare physical erasing units in which the valid data are to be retrieved, and the invention is not limited thereto.

FIG. 8 is a flowchart illustrating a memory management method according to an exemplary embodiment of the invention.

Referring to FIG. 8, in step S801, a write command is received and a spare physical erasing unit for writing data corresponding to the write command is selected from among a plurality of physical erasing units of a rewritable non-volatile memory module according to the write command. In step S802, an amount of remaining spare physical erasing units excluding the spare physical erasing unit selected in step S801 among the physical erasing units is detected. In step S803, whether the amount of the spare physical erasing units detected in step S802 is less than a threshold value is determined. Herein, the threshold value is a first threshold value. If the amount of the second spare physical erasing units is not less than the first threshold value, step S801 may be performed repeatedly.

If the amount of the remaining spare physical erasing units is less than the first threshold value, in step S804, a data merging procedure (i.e., a first procedure as described above) is performed to release new spare physical erasing units. Further, in step S804, according to an execution state of the performed first procedure, the first threshold value for determining whether to perform the first procedure is adjusted. Herein, the threshold value is adjusted from the first threshold value to a second threshold value. Methods regarding how to perform the first procedure and how to adjust the threshold value have been described above, which are not repeated hereinafter.

In step S805, whether an amount of current spare physical erasing units in the rewritable non-volatile memory module is greater than the second threshold value set in step S804 is determined. If a determination result of step S805 is no, it indicates that the amount of the spare physical erasing units is still insufficient, and therefore step S804 is repeatedly performed to release more spare physical erasing units. If the determination result of step S805 is yes, the first procedure is stopped and the threshold value is adjusted again in step S806. For example, the threshold value is adjusted from the second threshold value to a third threshold value. For example, the third threshold value may be the first threshold value or any preset value. After step S806 is performed, step S801 is repeatedly performed.

It is worth mentioning that, in step S804, whether the currently-used threshold value is the first threshold value (or the second threshold value) may also be determined. If the currently-used threshold value is the first threshold value, the threshold value may be adjusted to the second threshold value according to the execution state of the currently-performed first procedure. If the currently-used threshold value is not the first threshold value (e.g., the currently-used threshold value is already the adjusted second threshold value), the threshold value will not be adjusted again. As such, the threshold value may be prevented from being repeatedly adjusted.

Nevertheless, steps depicted in FIG. 8 are described in detail as above so that related description thereof is omitted hereinafter. It may be noted that, the steps depicted in FIG. 8 may be implemented as a plurality of program codes or circuits, which are not particularly limited in the invention. Moreover, the method disclosed in FIG. 8 may be implemented by reference with above exemplary embodiments, or may be implemented separately, which are not particularly limited in the invention.

In summary, the memory management method, the memory control circuit unit and the memory storage apparatus provided by an exemplary embodiment of the invention are capable of dynamically adjusting the threshold value for determining whether to perform the moving operation for the valid data (i.e., the data merging procedure). In particular, in one exemplary embodiment, in the case where the releasing efficiency for the spare physical erasing units is favorable, the adjustment made to the threshold value may be increased; and in the case where the releasing efficiency for the spare physical erasing units is poor, the adjustment made to the threshold value may be decreased. Accordingly, by controlling the trigger of the moving operation for the valid data (e.g., prolonging the moving operation for the valid data), the data access speed of the rewritable non-volatile memory module may be relatively more stable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, wherein the rewritable non-volatile memory module comprises a plurality of physical blocks, and the memory management method comprises:
   receiving a first write command and writing data corresponding to the first write command into a first spare physical block among the physical blocks;
   detecting a number of a plurality of second spare physical blocks excluding the first spare physical block among the physical blocks, wherein the number of the second spare physical blocks is a total of remaining spare physical blocks among the physical blocks after the first spare physical erasing unit is selected according to the first write command; and
   in response to determining that the number of the second spare physical blocks is less than a threshold value, performing a garbage collection procedure,
   wherein the performed garbage collection procedure comprises:
      moving a plurality of valid data in the physical blocks into at least one third spare physical block among the physical blocks; and
      adjusting the threshold value from a first threshold value to a second threshold value, so as to change a condition of determining whether perform the garbage collection procedure again or not after other writing data corresponding to a next write command has been written.

2. The memory management method of claim 1, wherein the step of adjusting the threshold value from the first threshold value to the second threshold value comprises:
   recording a number of the at least one third spare physical block storing the valid data; and
   determining the second threshold value according to the number of the at least one third spare physical block storing the valid data.

3. The memory management method of claim 2, wherein the step of recording the number of the at least one third spare physical block storing the valid data comprises:
   determining whether a number of a plurality of first non-spare physical blocks in which all the stored valid data are moved among the physical blocks matches a preset number; and
   if the number of the first non-spare physical blocks matches the preset number, recording the number of the at least one third spare physical block storing the valid data.

4. The memory management method of claim 3, wherein the step of determining the second threshold value according to the number of the at least one third spare physical block storing the valid data comprises:
   determining a difference value between the first threshold value and the second threshold value according to a reference value corresponding to the preset number and the number of the at least one third spare physical block storing the valid data,
   wherein the reference value is the preset number minus one.

5. The memory management method of claim 3, further comprising:
   allocating a plurality of logical units; and
   determining the preset number according to a total physical capacity of the physical blocks and a total logical capacity of the logical units,
   wherein the total physical capacity is greater than the total logical capacity.

6. The memory management method of claim 3, wherein the garbage collection procedure further comprises:
   selecting the first non-spare physical blocks from among the physical blocks according to a first rule; and
   selecting at least one second non-spare physical block excluding the first non-spare physical blocks from among the physical blocks according to a second rule after the number of the first non-spare physical blocks matching the preset number is determined,
   wherein the first rule is different from the second rule.

7. The memory management method of claim 1, further comprising:
   receiving a second write command after performing the garbage collection procedure;
   detecting a number of a plurality of fourth spare physical blocks among the physical blocks;
   determining whether the number of the fourth spare physical blocks is greater than the second threshold value; and
   stopping the garbage collection procedure and adjusting the threshold value from the second threshold value to a third threshold value if the number of the fourth spare physical blocks is greater than the second threshold value.

8. The memory management method of claim 7, wherein the third threshold value is equal to the first threshold value.

9. A memory control circuit, configured to control a rewritable non-volatile memory module, and the memory control circuit comprising:
   a host interface circuit, configured to couple to a host system;

a memory interface circuit, configured to couple to the rewritable non-volatile memory module, wherein the rewritable non-volatile memory module comprises a plurality of physical blocks; and a memory management circuit, coupled to the host interface circuit and the memory interface circuit, wherein the memory management circuit is configured to receive a first write command and send a write command sequence instructing to write data corresponding to the first write command into a first spare physical block among the physical blocks, wherein the memory management circuit is further configured to detect a number of a plurality of second spare physical blocks excluding the first spare physical block among the physical blocks, wherein the number of the second spare physical blocks is a total of remaining spare physical blocks among the physical blocks after the first spare physical erasing unit is selected according to the first write command, wherein in response to determining that the number of the second spare physical blocks is less than a threshold value, the memory management circuit is further configured to perform a garbage collection procedure, wherein the performed garbage collection procedure comprises:

instructing to move a plurality of valid data in the physical blocks into at least one third spare physical block among the physical blocks; and adjusting the threshold value from a first threshold value to a second threshold value, so as to change condition of determining whether perform the garbage collection procedure again or not after other writing data corresponding to a next write command has been written.

10. The memory control circuit of claim 9, wherein the operation of adjusting the threshold value from the first threshold value to the second threshold value by the memory management circuit comprises:

recording a number of the at least one third spare physical block storing the valid data; and determining the second threshold value according to the number of the at least one third spare physical block storing the valid data.

11. The memory control circuit of claim 10, wherein the operation of recording the number of the at least one third spare physical block storing the valid data by the memory management circuit comprises:

determining whether a number of a plurality of first non-spare physical blocks in which all the stored valid data are moved among the physical blocks matches a preset number; and recording the number of the at least one third spare physical block storing the valid data if the number of the first non-spare physical blocks matches the preset number.

12. The memory control circuit of claim 11, wherein the operation of determining the second threshold value according to the number of the at least one third spare physical block storing the valid data by the memory management circuit comprises:

determining a difference value between the first threshold value and the second threshold value according to a reference value corresponding to the preset number and the number of the at least one third spare physical block storing the valid data, wherein the reference value is the preset number minus one.

13. The memory control circuit of claim 11, wherein the memory management circuit is further configured to allocate a plurality of logical units, wherein the memory management circuit is further configured to determine the preset number according to a total physical capacity of the physical blocks and a total logical capacity of the logical units, wherein the total physical capacity is greater than the total logical capacity.

14. The memory control circuit of claim 11, wherein the operation of performing the garbage collection procedure by the memory management circuit further comprises:

selecting the first non-spare physical blocks from among the physical blocks according to a first rule; and selecting at least one second non-spare physical block excluding the first non-spare physical blocks from among the physical blocks according to a second rule after the number of the first non-spare physical blocks matching the preset number is determined, wherein the first rule is different from the second rule.

15. The memory control circuit of claim 9, wherein the memory management circuit is further configured to receive a second write command after performing the garbage collection procedure, wherein the memory management circuit is further configured to detect a number of a plurality of fourth spare physical blocks among the physical blocks, wherein the memory management circuit is further configured to determine whether the number of the fourth spare physical blocks is greater than the second threshold value, wherein the memory management circuit is further configured to stop the garbage collection procedure and adjust the threshold value from the second threshold value to a third threshold value if the number of the fourth spare physical blocks is greater than the second threshold value.

16. The memory control circuit of claim 15, wherein the third threshold value is equal to the first threshold value.

17. A memory storage apparatus, comprising:

a connection interface circuit, configured to couple to a host system;

a rewritable non-volatile memory module comprising a plurality of physical blocks; and a memory control circuit, coupled to the connection interface circuit and the rewritable non-volatile memory module, wherein the memory control circuit is configured to receive a first write command and send a write command sequence instructing to write data corresponding to the first write command into a first spare physical block among the physical blocks, wherein the memory control circuit is further configured to detect a number of a plurality of second spare physical blocks excluding the first spare physical block among the physical blocks, wherein the number of the second spare physical blocks is a total of remaining spare physical blocks among the physical blocks after the first spare physical erasing unit is selected according to the first write command, wherein in response to determining that the number of the second spare physical blocks is less than a threshold value, the memory control circuit is further configured to perform a garbage collection procedure, wherein the performed garbage collection procedure comprises:

instructing to move a plurality of valid data in the physical blocks into at least one third spare physical block among the physical blocks; and adjusting the threshold value from a first threshold value to a second threshold value, so as to change a condition of determining whether perform the garbage collection procedure again or not after other writing data corresponding to a next write command has been written, wherein the second threshold value is greater than the first threshold value.

18. The memory storage apparatus of claim 17, wherein the operation of adjusting the threshold value from the first threshold value to the second threshold value by the memory control circuit comprises:

recording a number of the at least one third spare physical block storing the valid data; and determining the second threshold value according to the number of the at least one third spare physical block storing the valid data.

19. The memory storage apparatus of claim 18, wherein the operation of recording the number of the at least one third spare physical block storing the valid data by the memory control circuit comprises:

determining whether a number of a plurality of first non-spare physical blocks in which all the stored valid data are moved among the physical blocks matches a preset number; and recording the number of the at least one third spare physical block storing the valid data if the number of the first non-spare physical blocks matches the preset number.

20. The memory storage apparatus of claim 19, wherein the operation of determining the second threshold value according to the number of the at least one third spare physical block storing the valid data by the memory control circuit comprises:

determining a difference value between the first threshold value and the second threshold value according to a reference value corresponding to the preset number and the number of the at least one third spare physical block storing the valid data, wherein the reference value is the preset number minus one.

21. The memory storage apparatus of claim 19, wherein the memory control circuit is further configured to allocate a plurality of logical units, wherein the memory control circuit is further configured to determine the preset number according to a total physical capacity of the physical blocks and a total logical capacity of the logical units, wherein the total physical capacity is greater than the total logical capacity.

22. The memory storage apparatus of claim 19, wherein the operation of performing the garbage collection procedure by the memory control circuit further comprises:

selecting the first non-spare physical blocks from among the physical blocks according to a first rule; and selecting at least one second non-spare physical block excluding the first non-spare physical blocks from among the physical blocks according to a second rule after the number of the first non-spare physical blocks matching the preset number is determined, wherein the first rule is different from the second rule.

23. The memory storage apparatus of claim 17, wherein the memory control circuit is further configured to receive a second write command after performing the garbage collection procedure, wherein the memory control circuit is further configured to detect a number of a plurality of fourth spare physical blocks among the physical blocks, wherein the memory control circuit is further configured to determine whether the number of the fourth spare physical blocks is greater than the second threshold value, wherein the memory control circuit is further configured to stop the garbage collection procedure and adjust the threshold value from the second threshold value to a third threshold value if the number of the fourth spare physical blocks is greater than the second threshold value.

24. The memory storage apparatus of claim 23, wherein the third threshold value is equal to the first threshold value.

* * * * *